United States Patent [19]

Riviere

[11] Patent Number: 5,111,517
[45] Date of Patent: May 5, 1992

[54] POLARIZATION BEAM SPLITTER FOR GUIDED LIGHT

[75] Inventor: Luc Riviere, Valbonne Sophia Antipolis, France

[73] Assignee: France Telecom Etablissment autonome de Droit Public (Centre National d'Etudes des Telecommunications, Issy les Moulineaus, France

[21] Appl. No.: 654,544

[22] Filed: Feb. 12, 1991

[30] Foreign Application Priority Data

Feb. 14, 1990 [FR] France ............................. 90 01742

[51] Int. Cl.$^5$ .................................. G02B 6/10
[52] U.S. Cl. .................................. 385/11; 385/14; 385/41; 385/45; 385/28
[58] Field of Search ............... 350/96.11, 96.12, 96.13, 350/96.14, 96.15, 96.16, 96.29, 96.30; 385/11, 12, 14, 27, 28, 40, 41, 45; 359/483, 484

[56] References Cited

U.S. PATENT DOCUMENTS

| | | | |
|---|---|---|---|
| 4,390,236 | 6/1983 | Alferness | 350/96.14 |
| 4,772,084 | 9/1988 | Bogert | 350/96.15 |
| 4,820,009 | 4/1989 | Thaniyavarn | 350/96.13 |
| 4,923,290 | 5/1990 | Brinkmeyer et al. | 385/11 X |
| 4,966,431 | 10/1990 | Heismann | 385/11 X |
| 5,004,314 | 4/1991 | Booth et al. | 350/96.14 |
| 5,016,958 | 5/1991 | Booth | 350/96.13 |

FOREIGN PATENT DOCUMENTS

| | | | |
|---|---|---|---|
| 0361152 | 4/1990 | European Pat. Off. | 350/96.14 X |
| 1246529 | 12/1989 | Japan | 385/11 X |
| 2179465 | 3/1987 | United Kingdom | 385/11 X |
| 2633060 | 12/1989 | France | 350/96.14 X |

OTHER PUBLICATIONS

Electronics Letters, vol. 23, No. 21, pp. 1145-1147 (H. Okayama et al., Oct. 12, 1987).
Electronics Letters, vol. 23, No. 12, pp. 614-616 (K. Habara, Jun. 4, 1987).
Article by T. Pohlman et al., published in Electronics Letters, vol. 24, No. 9, Apr. 1988, p. 503/531.
Abstract of JP-A-57 037 328 (Mitsubishi Denki K.K.).
Article by J. K. Nightingale et al., published in Applied Physics Letters, vol. 51, No. 10, 7.9.1987, pp. 716 to 718.
Article by S. P. Shipley, published in Electronics Letters, vol. 24, No. 8, Apr. 1988, pp. 478/479.
Article by H. F. Schlaak, published in Journal of Optical Communications, vol. 5, No. 4, Dec. 1984, pp. 122 to 131.

Primary Examiner—Brian Healy
Attorney, Agent, or Firm—Pearne, Gordon, McCoy & Granger

[57] ABSTRACT

This polarization beam splitter for guided light is e.g. produced on Z-propagating, X-cut LiNbO$_3$:Ti and comprises in series a passive Y-junction (66), an active phase shifter (68) and an active directional coupler (70), independent of the polarization and able to constitute a 3 dB coupler. Thus, on supplying a light wave to the input of the Y-branch and with the coupler constituting a 3 dB coupler, the TM and TE modes of the input wave are respectively obtained at the outputs of the coupler by appropriately polarizing the phase shifter. Application to optical fiber sensors or transducers and to the coherent transmission of information by monomode optical fibers.

7 Claims, 5 Drawing Sheets

POLARIZATION BEAM SPLITTER FOR GUIDED LIGHT

BACKGROUND OF THE INVENTION

The present invention relates to a polarization beam splitter for guided light.

It is used in the field of integrated optics, e.g. in connection with optical fiber sensors or transducers (e.g. electrical field sensors and temperature sensors), as well as in the coherent transmission of information by monomode optical fibers, or in the field of optical gyroscopes. In such fields, the polarization state of the optical waves used is a very important parameter.

In such fields, polarization beam splitters or simply beam splitters are essential devices permitting the spatial separation of the transverse electric TE and transverse magnetic TM modes from the optical waves used.

Various guided light polarization splitters are already known, which are produced on uniaxial electrooptical materials and in particular on $LiNbO_3$:Ti. On the latter material, whose crystallographic axes are conventionally designated X,Y and Z, the X and Y axes both correspond to the ordinary index of the material, whilst the Z axis corresponds to the extraordinary index of said material. It has already proved possible to produce:

directional couplers in propagation configurations along the X axis or Y axis (cf. document (1) which, like the other documents referred to hereinafter, is detailed at the end of the description), devices using two-mode interference methods (cf. document (2)), structures with Y-junctions (cf. document (3)) and splitters having ion exchange waveguide parts (cf. document (4)).

Figure 1:
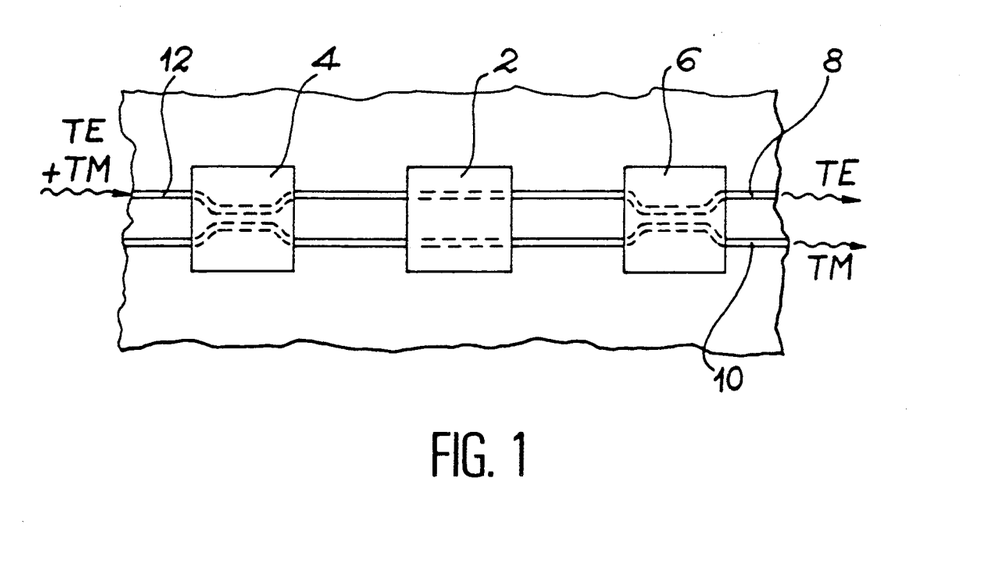
FIG. 1 is a diagrammatic view of a known polarization splitter, which has already been described.

In addition, document (5) discloses a polarization splitter, which is diagrammatically shown in FIG. 1. This known splitter comprises a phase shifter 2 interconnecting two 3 dB directional couplers 4 and 6. By appropriately polarizing this known splitter, it is possible to respectively obtain at the two outputs 8 and 10 of the coupler 6 the TE and TM modes of an input light wave, which arrives at one 12 of the two inputs of the coupler 4.

This known splitter suffers from the disadvantages of requiring a Mach-Zehnder interferometer using a passive phase shifter which, introduces between the guides an identical phase shift for the two polarizations TE and TM, such a passive phase shifter being e.g. obtained by a local modification of the width of the optical guide, as will be shown hereinafter, while it also does not make it possible to eliminate the phase displacements which occur between the two output waves of the couplers 4 and 6, when action takes place on said assumed active couplers to bring them into the 3 dB state.

SUMMARY OF THE INVENTION

The aim of the invention is to obviate these disadvantages.

To this end, the splitter according to the invention has at the input a Y-junction and not a 3 dB coupler.

The present invention specifically relates to a polarization beam splitter for guided light produced on a substrate and characterized in that it comprises:

a passive Y-junction having an input and two outputs and which is able to separate or split into two waves of the same amplitude and in phase with one another, an input light wave reaching the input of the Y-junction and which is a combination of the two guided optical modes, namely a transverse electric mode TE and a transverse magnetic mode TM, an active phase shifter with two arms respectively having two inputs, which respectively extend the two outputs of the Y-junction and two outputs, said phase shifter being able to induce a phase shift F of the TE mode, which is propagated in one of the arms compared with the TE mode which propagates in the other arm and a phase shift $-F$ of the TM mode, which propagates in the said arm compared with the TM mode propagating in the other arm, the substrate being made from a material making it possible to induce opposite variations DN and $-DN$ respectively on the refractive index associated with the TE mode and on the refractive index associated with the TM mode and an active directional coupler, independent of the polarization and able to constitute a 3 dB coupler by an appropriate polarization of the electrodes of said coupler and having two inputs, which respectively extend the two outputs of the phase shifter, as well as two outputs, in such a way that when the coupler constitutes a 3 dB coupler the TM mode of the input wave is obtained at one of the two outputs of the coupler and the TE mode of said input wave is obtained at the other output of the coupler by appropriately polarizing the electrodes of the phase shifter.

As the coupler is active, it is possible to place it in a 3 dB state in the case that it was not precisely in said state in the absence of polarization.

The present invention obviates the use of a passive phase shifter identical for the two polarizations TE and TM and as the output coupler is an active coupler, when it is brought into a 3 dB state by an appropriate polarization thereof, it is possible to compensate the undesirable phase shift which then appears between the two outputs of the said coupler by appropriately adjusting the polarization of the phase shifter.

The phase shifter used in the present invention can have a push-pull structure.

The splitter according to the invention can be provided with control means making it possible to switch the TM and TE modes respectively obtained at the outputs of the coupler.

The variations of the refractive indices respectively associated with the TE mode and the TM mode can be induced by an electrooptical effect.

According to a special embodiment of the splitter according to the invention, the substrate material is chosen from among those materials belonging to the 3 m trigonal crystalline symmetry group, the substrate material consequently being a uniaxial electrooptical material having three crystallographic axes X,Y and Z, which are perpendicular to one another, the X and Y axes both corresponding to the ordinary index No of the material, whilst the Z axis corresponds to the extraordinary axis Ne of said material, the substrate face on which the splitter is formed being perpendicular to one of the X and Y axes and the splitter is formed in such a way that the guided light is propagated parallel to the Z axis in the said splitter.

In the aforementioned group, it is possible to choose $LiNbO_3$. The splitter is then produced on X-cut or Y-cut, Z-propagating $LiNbO_3$ (cf. document (6)).

Such a configuration makes it possible to significantly reduce the modal birefringence and facilitates the integration on said same substrate of the polarization splitter and polarization converters, whereof the electrode structure is then considerably simplified compared with X-propagating or Y-propagating configurations.

The Y-junction, the phase shifter and the coupler can then be produced by local Ti diffusion, ion exchange or implantation in LiNbO$_3$.

BRIEF DESCRIPTION OF THE DRAWINGS

The invention is described in greater detail hereinafter relative to non-limitative embodiments and the attached drawings, wherein show.

Figure 2:
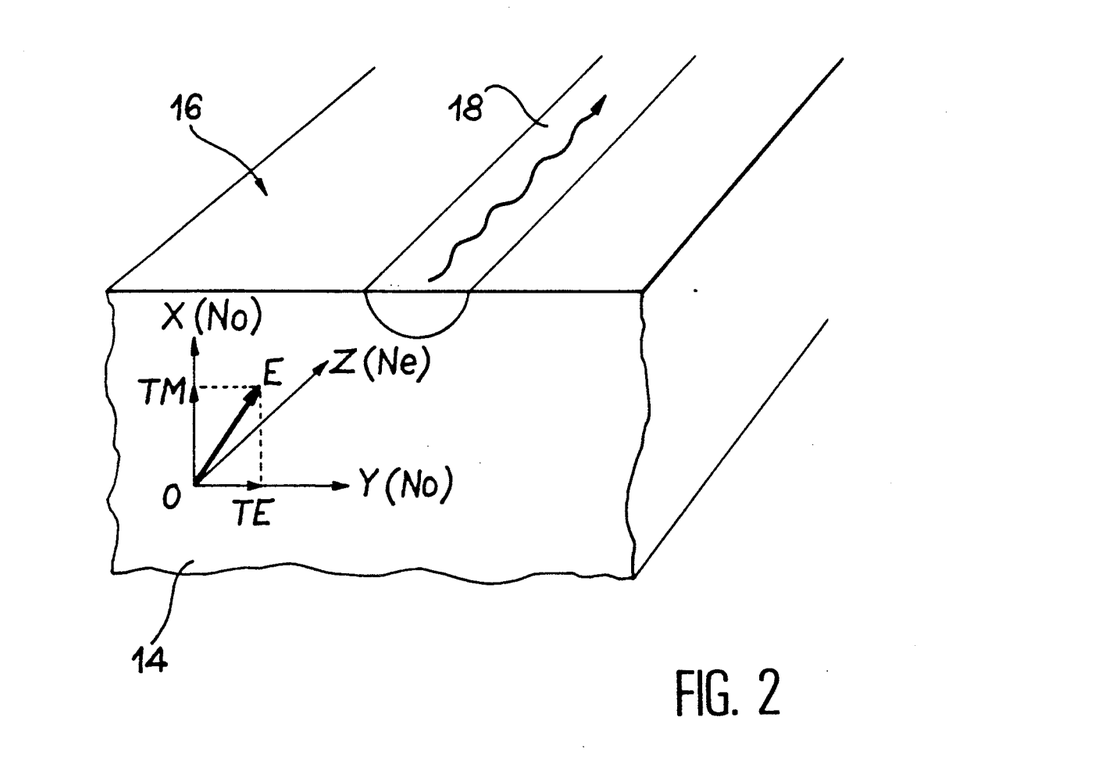
FIG. 2 is a diagrammatic sectional view of a material usable in the present invention.

FIG. 2 is a diagrammatic sectional view of a substrate 14 made from a uniaxial electrooptical material on which it is possible to produce a splitter according to the invention. This material has three crystallographic axes X, Y and Z. Each of these axes is perpendicular to the two others. Moreover, each of the axes X and Y corresponds to the ordinary index No of the material, while the axis Z corresponds to the extraordinary axis Ne of the said material.

The face 16 of the substrate on which the splitter is produced is perpendicular either to the axis X or to the axis Y.

In the case of FIG. 2, the splitter is produced on a face perpendicular to the X axis.

FIG. 2 shows part 18 of a waveguide of the splitter and produced by local diffusion of an appropriate material, by ion exchange or implantation in the substrate 14.

The electrical field E of a light wave reaching the splitter is, in conventional manner, considered to be the sum of the two modes TE and TM, which are perpendicular to one another and perpendicular to the light wave propagation direction which, in the present case, is parallel to the axis Z.

It is also known that the mode TE is parallel to the substrate face 16, while the mode TM is perpendicular to said face 16. Thus, in the case where the face 16 is perpendicular to the X axis (FIG. 2), the mode TE is counted on the Y axis and the mode TM on the X axis.

Obviously, if the substrate face on which the splitter was produced was perpendicular to the Y axis, the mode TE would be counted on the X axis and the mode TM on the Y axis.

Figure 3:
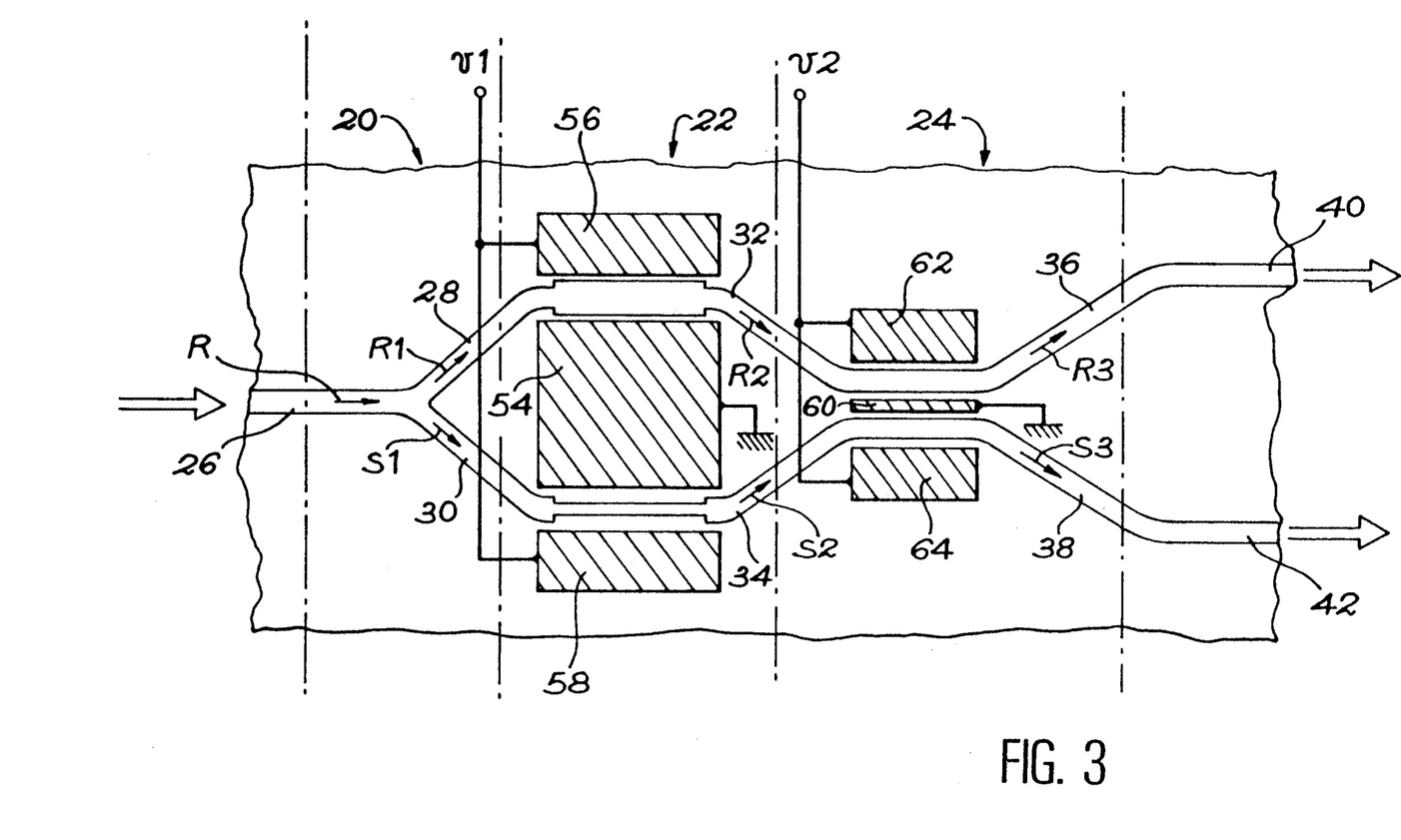
FIG. 3 is a diagrammatic plan view of a structure incorporating in series a Y-junction, a mixed phase shifter and a directional coupler permitting the theoretical analysis of the invention.

FIG. 3 shows in diagrammatic plan view a structure permitting the theoretical analysis of the invention, said structure being of X-cut, Z-propagating LiNbO$_3$.

The structure shown in FIG. 3 successively comprises a Y-junction 20, a phase shifter 22 and a directional coupler 24. The Y-junction 20 has an input 26 and two outputs 28 and 30, which are respectively connected to the two inputs of the phase shifter 22.

The phase shifter 22 has two outputs 32 and 34, which respectively correspond to the two inputs 28 and 30 and which are respectively connected to the two inputs of the directional coupler 24. The latter has two outputs 36 and 38, which respectively correspond to the two outputs 32 and 34, as can be seen in FIG. 3.

A light wave is supplied to the input 26 of the Y-junction 20. This light wave can come from a not shown optical fiber and can be injected into the input 26 of the Y-junction by an appropriate optics, or can come from a not shown waveguide, which is produced on the same face of the material as the splitter and which is extended by the input 26 of the Y-junction 20.

The structure of FIG. 3 would constitute a polarization beam splitter if the two modes TE and TM of the guided light wave were respectively available at the two outputs of the directional coupler 24.

FIG. 3 shows that the two outputs 36 and 38 of the coupler 24 can be respectively connected to two waveguides 40 and 42, which are produced on the same face as the structure of FIG. 3. The structure shown in FIG. 3 is the most general structure available. Its directional coupler 24 is an active coupler.

It is possible to consider that a passive directional coupler is an active coupler which is not electrically polarized. The phase shifter 22 is a mixed phase shifter, i.e. a combination of an active phase shifter and a passive phase shifter.

It is pointed out in this connection that a phase shifter has on an appropriate substrate, two optical guides 44 and 46 (FIGS. 4 to 6), which are parallel to and sufficiently removed from one another that it is possible to ignore any coupling between them, i.e. any transfer of light energy from one guide to the other, for a propagation length of a few centimeters.

Figure 4:
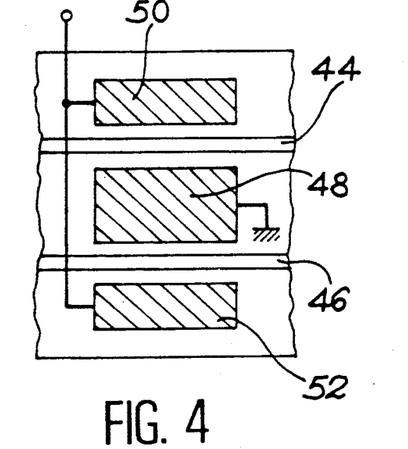
FIG. 4 is a partial diagrammatic plan view of an active phase shifter.

However, a phase shift between the waves respectively propagating in the two optical guides can be introduced by an electrooptical effect (FIG. 4). To this end, an electrode 48 is located between the two guides 44 and 46 and two electrodes 50 and 52 on either side of the assembly formed by the guides 44,46 and the electrode 48, reference then being made to an "active phase shifter".

Figure 5:
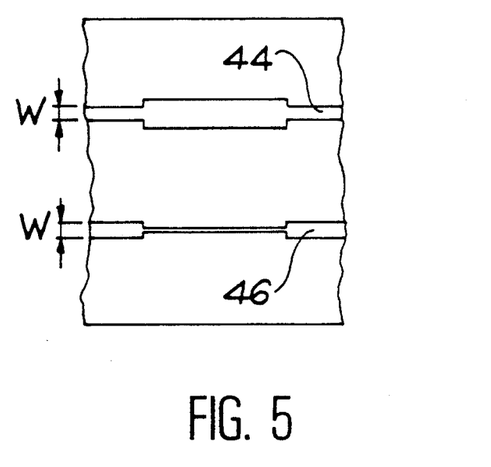
FIG. 5 is a partial plan view of a passive phase shifter.

The phase shift between the two waves can be obtained by a modification of the configuration of the guides and in particular their width w (FIG. 5).

There is then no longer an electrode and, on the substrate in the area where the phase shifter is located, the width of one of the two guides is increased, whereas the width of the other guide is decreased in said same area and as can be seen in FIG. 5. Reference is then made to a "passive phase shifter".

It is also possible to combine an active and a passive phase shifter (FIG. 6), reference then being made to a "mixed phase shifter".

Figure 6:
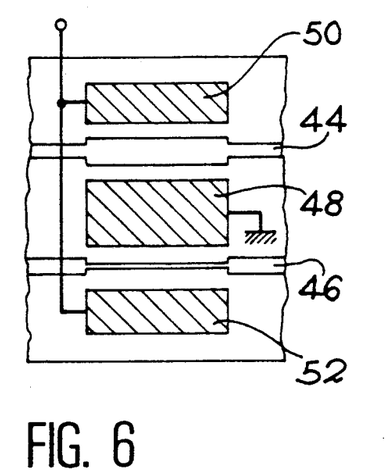
FIG. 6 is a diagrammatic, partial plan view of a mixed phase shifter.

In this case, the phase shifter has electrodes 48, 50 and 52. In addition, the guides 44 and 46 have different widths in the area of the phase shifter, as was shown in the case of FIG. 5.

It is pointed out that in order to make the phase shifter of FIG. 4 function like that of FIG. 6, an appropriate voltage is applied between the electrode 48 and the electrode 50, while also applying an appropriate voltage between the electrode 48 and the electrode 52. For example electrode 48 can be earthed or grounded and the electrodes 50,52 can be raised to an appropriate potential.

FIG. 3 shows the electrodes 54,56 and 58 of the phase shifter (assumed to be mixed in the most general case), which are respectively the homologs of electrodes 48,50 and 52 of FIGS. 4 and 6. In order to make the phase shifter 22 function, the electrode 54 can e.g. be earthed or grounded and the electrodes 56,58 can be raised to an appropriate potential v1.

It can also be seen in FIG. 3 that the coupler 24, which in the most general case is an active coupler, comprises an electrode 60 between the two optical guides thereof, as well as two electrodes 62,64 located on either side of the assembly formed by the electrode 60 and the two guides of the coupler 24.

In order to make the coupler 24 function, electrode 60 can be grounded and the electrodes 62 and 64 can be raised to an appropriate potential v2.

On returning to the splitter according to the invention, a correct operation of said splitter requires that the 3 dB state of its coupler is obtained both for the polarization TE and for the polarization TM of the light wave guided by the said splitter. Thus, a condition for correct operation is that the 3 dB coupler is independent of the polarization.

Assuming that the coupling length lc relative to TE and the coupling length lc relative to TM are equal and that the overlap between the electric field of the electromagnetic wave and the electric field which is applied as a result of the coupler electrodes is the same for the two polarizations TE and TM, said condition is automatically satisfied for couplers in a propagation configuration along the Z axis. As the electrooptical coefficients r12 and r22 are opposite, the figurative points of the control diagram (FIG. 7) corresponding to the state of the coupler for the polarizations TE and TM are symmetrical with respect to the ordinate axis.

Figure 7:
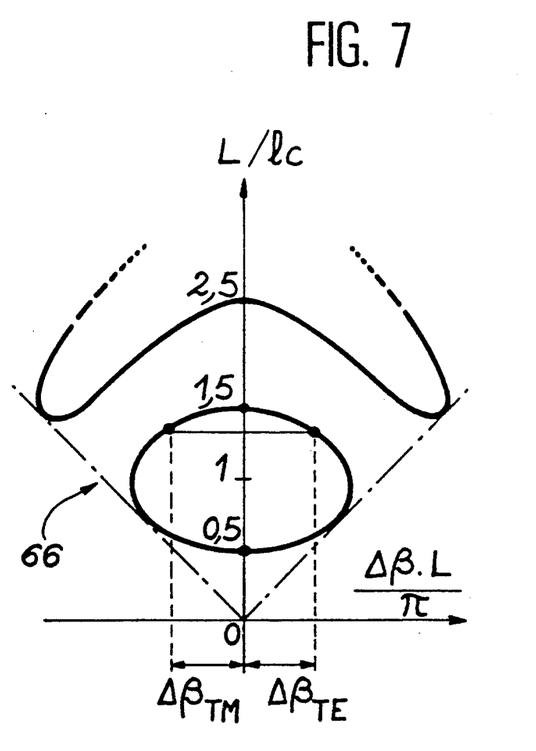
FIG. 7 of the control diagram of a directional coupler usable in the invention.

It is pointed out that in this control diagram, on the abscissa is plotted the parameter (delta beta.L/pi), in which pi is the number equal to approximately 3.1416, L is the length of the electrodes and delta beta is the difference between the propagation constants associated with the symmetrical and antisymmetrical propagation modes of the coupler. The quantity L/lc is plotted on the ordinate axis.

As the locus 66 (FIG. 7) of the 3 dB states also has a symmetry with respect to the ordinate axis, it is possible to deduce therefrom that a polarization of the coupler making it possible to reach a 3 dB state for a polarization (TE or TM) also makes it possible to obtain a 3 dB state for the other polarization.

On returning to FIG. 3, the operation of the structure shown therein will now be analysed.

The optical wave, which is injected into said structure and which is represented by a vector R, has two vibratory components according to the polarizations TE and TM of the optical guide of the structure and which are respectively designated ATE and ATM. Thus, it is possible to write:

$$R = (ATM \; ; ATE)$$

Therefore the Y-junction supplies to the two outputs of the phase shifter 22, two waves which are represented by the vectors R1 and S1 and which have the same amplitude and are in phase, the wave R1 corresponding to the output 28 of the Y-junction and the wave S1 corresponding to the output 30 of the Y-junction. It is possible to write:

$$R1 = S1 = 2^{-\frac{1}{2}}(ATM \; ; ATE)$$

The phase shifter, in its most general form associating a passive phase effect and an active phase effect, allocates four different, independently adjustable phase shifts to the four components of the waves R1 and S1. These phase shifts are designated a,b,c and d.

The waves respectively obtained at the outputs 32 and 34 of the phase shifter can be respectively represented by two vectors R2 and S2, which are defined by the following formulas:

$$R2 = 2^{-\frac{1}{2}}(ATM.e^{ja} \; ; ATE.e^{jb})$$

$$S2 = 2^{-\frac{1}{2}}(ATM.e^{jc} \; ; ATE.e^{jd})$$

in which j is such that: $j^2 = -1$.

The 3 dB output coupler is characterized by a phase factor f and mixes the components TE of R2 and S2 with one another, as well as components TM of R2 and S2 with a weighting by the phase factor f.

Then, the vector R3 associated with the light wave available at the output 36 of the coupler 24 and the vector S3 associated with the light wave available at the output 38 of said coupler 24 are given by the following formulas, taken from the theory of coupled waves and applied to the directional coupler:

$$R3 = 2^{-1}(ATM.e^{ja}(e^{jf} - e^{j(c-a+pi/2)}) \; ; \\ ATE.e^{j(d-f)}(e^{j(b-d-pi/2)} - e^{jf}))$$

$$S3 = 2^{-1}(-jATM.e^{j(a-f)}(e^{jf}e^{j(c-a-pi/2)}) \; ; \\ ATE.e^{jd}(e^{jf} - e^{j(b-d+pi/2)}))$$

The two cases where polarization splitting can take place correspond to:

1) component TE at the output 36 (R3) and component TM at the output 38 (S3):

$$f = c - a + pi/2 \text{ (modulo 2 pi)}$$
$$= b - d + pi/2 \text{ (modulo 2 pi)}$$

2) component TM at the output 36 (R3) and component TE at the output 38 (S3):

$$f = c - a - pi/2 \text{ (modulo 2 pi)}$$
$$= b - d - pi/2 \text{ (modulo 2 pi)}$$

It is pointed out that the condition c−a=b−d, which must be proved in all cases, characterizes an active phase shifter, that it is possible to use at the output a passive coupler, which is such that f=0, which leads to: c−a=b−d=pi/2 (modulo 2 pi), and that the choice, for an active phase shifter, of a push-pull structure (potential differences of the same amplitude and opposite signs on the two channels of the phase shifter) implies supplementary conditions: a=d and b=c. Thus, we obtain: a=d=−b=−c=±pi/4 (modulo 2 pi).

Figure 8:
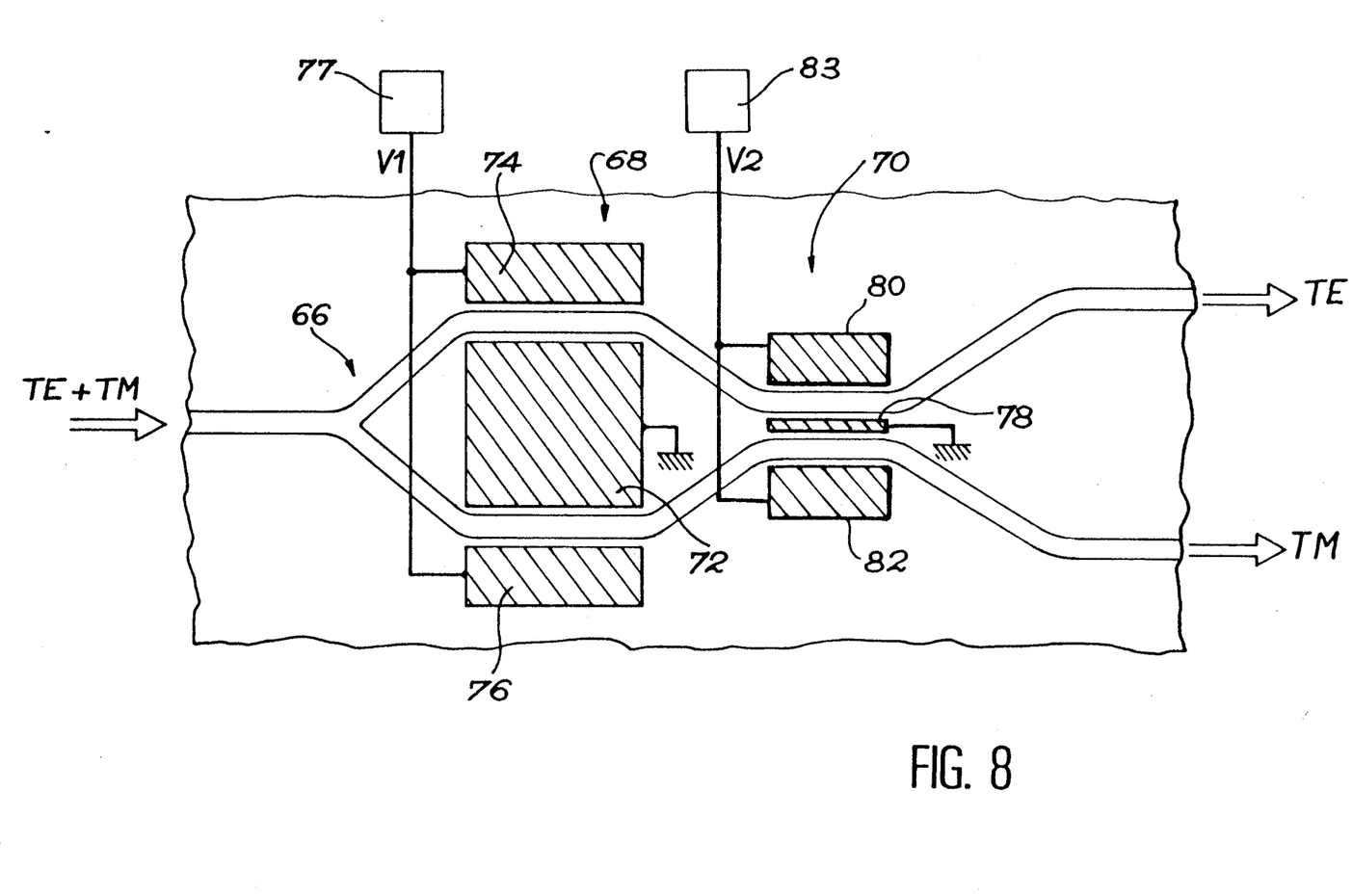
FIG. 8 is diagrammatic plan view of a special embodiment of the polarization splitter according to the invention.

This corresponds to a polarization splitter which would be obtained on the basis of the special embodiment of the invention diagrammatically shown in plan view in FIG. 8 and which would have a passive coupler and therefore no electrodes. The electrodes shown in FIG. 8 correspond to this special embodiment in which the coupler is active and which will be explained hereinafter.

More specifically, the splitter shown in FIG. 8 is produced on X-cut, Z-propagating LiNbO$_3$ and comprises a Y-junction 66, which splits the input wave into two equal parts and which are in phase with one another in order to supply said two input wave parts respectively to the two arms of an active phase shifter 68.

As can be seen in FIG. 8, said phase shifter 68 comprises a central electrode 72 and two end electrodes 74,76, the two guides of the phase shifter 68 passing respectively between the electrodes 72,74 and between the electrodes 72,76.

The phase shifter 68 is controlled by appropriate means 77, which bring the electrodes 74,76 to an appropriate potential V1, the electrode 72 being grounded or earthed. The potential V1 is a potential inducing imposed phase shifts between the TE and TM modes of the input wave.

These TE and TM modes are then combined in a 3 dB directional coupler 70, whose two input arms are respectively connected to the two arms of the phase shifter and interference effects bring about the spatial separation between the TE mode and the TM mode, which are then respectively available at the two outputs of the coupler 70.

In the special embodiment of the invention, the coupler 70 is an active coupler having a central electrode 78 located between the two optical guides of said coupler and two electrodes 80 and 82 on either side of the assembly incorporating said two coupler guides and the electrode 78.

In order to control such an active coupler, it is possible to use appropriate control means 83 making it possible to bring the electrodes 80 and 82 to an appropriate potential V2, the electrode 78 being grounded.

The use of an active coupler gives the splitter, which is in accordance with the invention and shown in FIG. 8, a supplementary regulating possibility in the case where the passive state of the coupler (V2=0) is not precisely a 3 dB state.

The control diagram of the coupler shows that if the ratio L/lc proves the double inequation $$n+0.5 \leq L/lc \leq n+1.5.$$

in which n is a natural integer, it is still possible to obtain a 3 dB state by applying a voltage, i.e. by varying the delta beta parameter with L/lc constant. However, the modification of the delta beta parameter introduced leads to a variation Df of the phase shift f characteristic of the coupler.

The interest of the invention is that it is possible to compensate this variation by acting on the voltage applied to the active phase shifter 68.

Thus, by designating aO, bO, cO and dO the respective values of a,b,c and d corresponding to the ideal case of the polarization splitter having a purely passive 3 dB output coupler, it is assumed that the coupler is imperfect and that it is necessary to introduce a variation Df of the phase shift to bring the coupler into a 3 dB state. The voltage V applied to the phase shifter is then varied by a quantity DV. The quantities a,b,c and d then vary respectively by Da, Db, Dc and Dd.

In order to obtain the splitting of the polarizations, said variations must prove the following conditions:

$$Df = Dc - Da = Db - Dd$$

As the phase shifter is purely active and has a push-pull structure the variations Da, Db, Dc and Dd prove:

$$Da = -Db = -Dc = Dd$$

It can therefore be seen that if the voltage V applied to the phase shifter is modified by a quantity DV such that:

$$Da = -Db = -Dc = Dd = -Df/2$$

the polarization splitting effect is again obtained.

It should be noted that the splitter according to the invention can be used as a polarization switch. Thus, it may be of interest to be able to switch the two polarizations TE and TM between the two outputs of the coupler used in the present invention.

The simplest way to achieve this is to replace the quantities a,b,c and d by opposite quantities, i.e. in the case of the splitter of FIG. 8, to reverse the voltage applied to the phase shifter, the means 77 then being provided for this purpose. It is also necessary to reverse the control voltage applied to the coupler 70, the means 83 being provided for this purpose in the case of the splitter of FIG. 8. Thus, it is clear that the splitter according to the invention can be used as a polarization switch.

However, this makes it necessary for the coupling lengths and the electrooptical overlap integrals corresponding to the TM and TE modes to be identical.

In a purely indicative and non-limitative manner, it is possible to produce a splitter according to the invention with a purely active phase shifter and an active coupler on X-cut, Z-propagating LiNbO$_3$ by a conventional titanium diffusion technology and having the following characteristics:

diffusion temperature : 1000° C.
diffusion time : 8 hours
thickness of titanium layer used as the diffusion source : 80 nm
waveguide length : 9 micrometers
phase shifting zone length : 6000 micrometers
coupler interaction length : 6000 micrometers
coupler gap between the two guides of the coupler, measured in the interaction zone : 9 micrometers.

The splitter corresponding to the above data was tested with respective TE and TM injections using a HeNe laser of wave length 1.52 micrometer and having crosstalk levels below −18 dB with polarizing voltages V1=3V and V2=19V.

Materials other than LiNbO$_3$ can be used in the present invention, e.g. X-cut, Z-propagating LiTaO$_3$.

In the present invention, instead of using X-cut, Z-propagating LiNbO$_3$ or LiTaO$_3$, it is possible to use the same material in Y-cut, Z-propagating form. In both cases it is necessary for the electric field Eg applied to the guides g1, g2 of the splitter (FIGS. 9 and 10) to be directed in accordance with the Y axis.

In the case of a X-cut, the splitter electrodes, such as the electrodes e1, e2, e3 (FIG. 9), must consequently make it possible to apply an electric field parallel to the surface of the material on which the splitter is produced.

Figure 9:
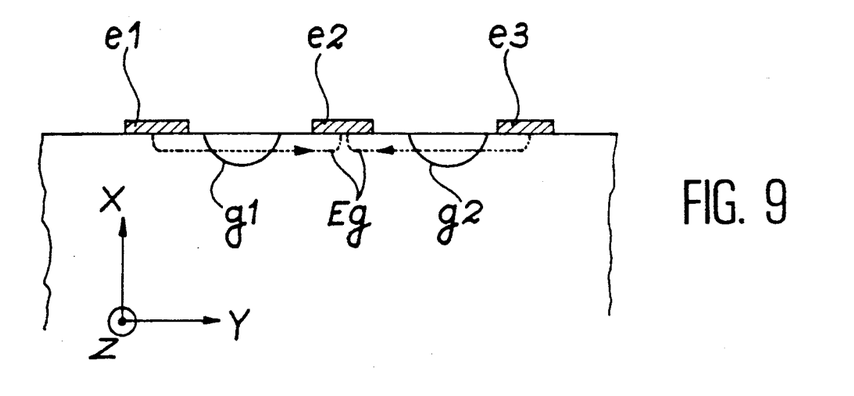
FIG. 9 is diagrammatically the possibility of producing a splitter according to the invention on a X-cut, Z-propagating LiNbO$_3$-type material.

FIG. 9 shows that these electrodes e1, e2 and e3 can be placed on the surface of the material and on either side of the guides g1 and g2.

In the case of a Y-cut, the splitter electrodes, such as electrodes e'1, e'2 and e'3 (FIG. 10) must make it possible to apply an electric field Eg perpendicular to the surface of the material on which the splitter is produced.

Figure 10:
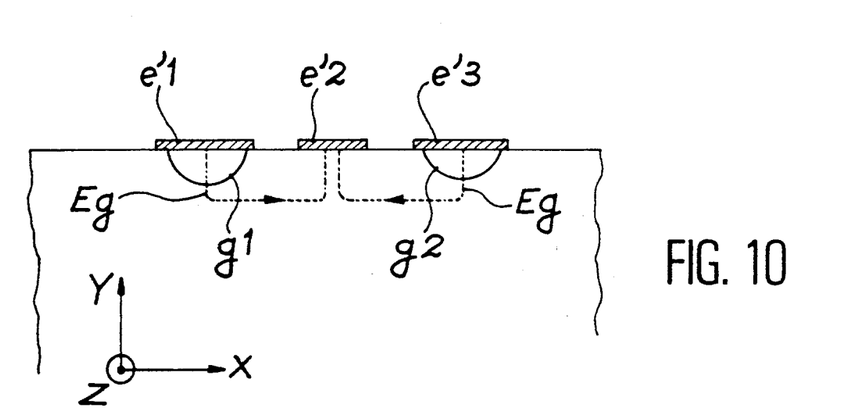
FIG. 10 is diagrammatically the possibility of producing a splitter according to the invention on a Y-cut, Z-propagating LiNbO$_3$-type material.

FIG. 10 shows that these electrodes e'1, e'2 and e'3 can be placed on the surface of the material, the electrodes e'1 and e'3 being located on the guides g1 and g2 and the electrode e'2 between the said guides.

Finally, in the present invention, materials other than those belonging to the LiNbO$_3$ family can be used.

It is possible to produce a splitter according to the invention on a substrate formed from any material making it possible to induce opposite variations DN and $-$DN respectively on the refractive index associated with the TE mode and on the refractive index associated with the TM mode (said TE and TM modes corresponding to the light wave reaching the splitter input).

Thus, it is possible to use gallium arsenide GaAs, which is a semiconductor forming part of the cubic e,ovs/43/ m crystalline symmetry group.

Figure 11:
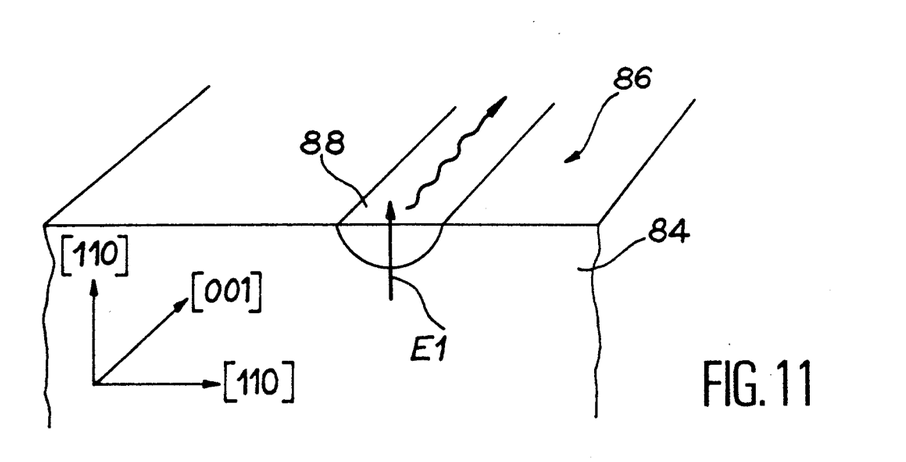
FIG. 11 is a diagrammatic sectional view of another material usable in the present invention.

For example, use is made of a GaAs substrate 84 (FIG. 11), the face 86 of the said substrate on which is produced the splitter, whereof part 88 is shown in FIG. 11, is perpendicular to the crystallographic axis $|\bar{1}10|$, each electric field E1 necessary for the operation of the splitter being applied in accordance with the axis $|\bar{1}10|$, i.e. perpendicular to the substrate, the guided light propagation direction being parallel to the axis $|001|$. Under these conditions, the TM mode is polarized along the axis $|\bar{1}10|$ and the TE mode along the axis $|\bar{1}10|$.

In this example, the refractive indices $N_{TE}$ and $N_{TM}$, which are respectively associated with the modes TE and TM, have as expressions:

$$N_{TE} = n_O - \tfrac{1}{2} \cdot n^3_O \cdot r_{41} \cdot |E1|$$

$$N_{TM} = n_O + \tfrac{1}{2} \cdot n^3_O \cdot r_{41} \cdot |E1|$$

in which E1 represents the modulo of E1, $r_{41}$ represents the sole non-zero coefficient of the electrooptical tensor of GaAs and $n_O$ represents the value common to NTE and NTM in the absence of the field E1. It can be seen that the variations of $N_{TE}$ and $N_{TM}$ induces by the electrooptical effect are opposite.

CITED DOCUMENTS (1) GRANESTRAND, THYLEN, STOLTZ, Electron. Lett., 24, No 18, 1142, (1988), "Polarization independent switch and polarization splitter employing delta beta and delta kappa modulation"

(2) PAPUCHON, ROY, OSTROWSKY, Appl. Phys. Lett., 31, 266 (1977), "Electrically active optical bifurcation : BOA"

(3) FINAK, YIP, Opt. Quant. El., 17, 15 (1985)

(4) FUJII, HIDAKA, Proc. 4th I00C TOKYO, (1983) 29A1-4, "LiNbO$_3$ optical waveguide fabricated by the ion exchange technique and its application to TE/TM mode splitter"

(5) CHUNG, CHIANG, Optics and Lasers Technology, Apr. 1983, pp. 83 to 90

(6) BOURBIN, ENARD, WERNER, VATOUX, PAPUCHON, 5th International Conference on Integrated Optics, ECIO 1989, "A polarization splitter in integrated optics".

I claim:

1. A polarization beam splitter for guided light produced on a substrate (14) comprising:

a passive Y-junction (66) having an input and two outputs and which is able to separate or split into two waves of the same amplitude and in phase with one another, an input light wave reaching the input of the Y-junction and which is a combination of two guided optical modes, namely a transverse electric mode TE and a transverse magnetic mode TM, an active phase shifter (68) with two arms respectively having two inputs, which respectively extend the two outputs of the Y-junction and two outputs, said phase shifter being able to induce a phase shift F of the TE mode which is propagated in one of the arms with respect to the TE mode which propagates in the other arm and a phase shift $-$F of the TM mode which propagates in the said arm with respect to the TM mode propagating in the said other arm, the substrate being made from a material making it possible to induce opposite variations DN and $-$DN respectively on the refractive index associated with the TE mode and on the refractive index associated with the TM mode and, an active directional coupler (70), independent of the polarization and able to constitute a 3 dB coupler by an appropriate polarization of the electrodes (78,80,82) of said coupler and having two inputs, which respectively extend the two outputs of the phase shifter, as well as two outputs, in such a way that when the coupler constitutes a 3 dB coupler the TM mode of the input wave is obtained at one of the two outputs of the coupler and the TE mode of said input wave is obtained at the other output of the coupler by appropriately polarizing the electrodes (72,74,76) of the phase shifter.

2. A splitter according to claim 1, wherein the phase shifter (68) has a push-pull structure.

3. A splitter according to claim 1, wherein it is provided with control means (77,83) making it possible to switch the TM and TE modes respectively obtained at the outputs of the coupler (70).

4. A splitter according to claim 1, wherein the variations of the refractive indices are induced by an electrooptical effect.

5. A splitter according to claim 4, wherein the substrate material is chosen from among materials belonging to the 3 m trigonal crystalline symmetry group, the material of the substrate thus being a uniaxial electrooptical material having three crystallographic axes X,Y and Z which are perpendicular to one another, the X and Y axes both corresponding to the ordinary index No of the material, whilst the Z axis corresponds to the extraordinary axis Ne of the material, in that the substrate face (16) on which the splitter is formed is perpendicular to one of the X and Y axes and in that the splitter is formed in such a way that the guided light propagates parallel to the Z axis in the said splitter.

6. A splitter according to claim 5, wherein the substrate material is LiNbO$_3$.

7. A splitter according to claim 6 wherein the Y-junction (66), the phase shifter (68) and the coupler (70) are produced by local Ti diffusion, ion exchange or implantation in LiNbO$_3$.

* * * * *

UNITED STATES PATENT AND TRADEMARK OFFICE
CERTIFICATE OF CORRECTION

PATENT NO. : 5,111,517            Page 1 of 2
DATED : May 5, 1992
INVENTOR(S) : Luc Riviere It is certified that error appears in the above-identified patent and that said Letters Patent is hereby corrected as shown below:

On the face of the patent, under Assignee, line 5, "Moulineaus" should be --Moulineaux--.

On the face of the patent, under Other Publications, line 6, "503/531" should be --530/1--.

Column 3, line 23, after "is a" insert --diagrammatic,--.

Column 3, line 26, after "Fig. 7" insert --is part--.

Column 3, line 28, after "is" insert --a--.

Column 5, line 47, "beta.L/pi)," should be --beta L/pi),--.

Column 6, line 42, "$e^{7(b-d + pi/2)}$" should be --$e^{j(b-d + pi/2)}$--.

Column 9, line 26, "e,ovs/43/ m" should be --$\overline{4}3$ m--.

Column 9, line 36, "$|\overline{110}|$" (second occurrence) should be --$|110|$--.

Column 9, line 41, "$1/2n^3o \cdot r_{41} \cdot |E1|$" should be --$1/2n_o^3 \cdot r_{41} \cdot |E1|$--.

Column 9, line 43, "$N_{TM}n_o$" should be --$N_{TM} = n_o$--.

Column 9, line 43, "$1/2n^3o \cdot r_{41} \cdot |E1|$" should be --$1/2n_o^3 \cdot r_{41} \cdot |E1|$--.

Column 9, line 47, "NTE" should be --$N_{TE}$--.

Column 9, line 47, "NTM" should be --$N_{TM}$--.

UNITED STATES PATENT AND TRADEMARK OFFICE
CERTIFICATE OF CORRECTION

PATENT NO. : 5,111,517
DATED : May 5, 1992
INVENTOR(S) : Luc Riviere

It is certified that error appears in the above-indentified patent and that said Letters Patent is hereby corrected as shown below:

Column 9, line 49, "induces" should be --induced--.

Signed and Sealed this

Twenty-eighth Day of September, 1993

Attest:

BRUCE LEHMAN

*Attesting Officer*    *Commissioner of Patents and Trademarks*